(12) United States Patent
Miyawaki et al.

(10) Patent No.: US 12,462,537 B2
(45) Date of Patent: Nov. 4, 2025

(54) TRAINING DEVICE, TRAINING METHOD AND NON-TRANSITORY COMPUTER READABLE MEDIUM STORING TRAINING PROGRAM

(71) Applicant: SCREEN HOLDINGS CO., LTD., Kyoto (JP)

(72) Inventors: Miwa Miyawaki, Kyoto (JP); Toshiyuki Okayama, Kyoto (JP); Takeshi Noguchi, Kyoto (JP); Yoshinori Shimada, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 285 days.

(21) Appl. No.: 18/471,523

(22) Filed: Sep. 21, 2023

(65) Prior Publication Data
US 2024/0104903 A1    Mar. 28, 2024

(30) Foreign Application Priority Data
Sep. 26, 2022 (JP) .................................. 2022-153036

(51) Int. Cl.
*G06V 10/774* (2022.01)
*G06V 10/776* (2022.01)

(52) U.S. Cl.
CPC .......... *G06V 10/774* (2022.01); *G06V 10/776* (2022.01)

(58) Field of Classification Search
CPC ........................... G06V 10/774; G06V 10/776
See application file for complete search history.

(56) References Cited

U.S. PATENT DOCUMENTS

| | | | |
|---|---|---|---|
| 10,467,526 B1* | 11/2019 | Appalaraju | G06V 10/774 |
| 10,572,800 B2* | 2/2020 | Wang | G06N 3/08 |
| 11,017,259 B2* | 5/2021 | Ambikapathi | G06V 10/44 |
| 11,126,890 B2* | 9/2021 | Lin | G06N 3/045 |
| 11,272,097 B2* | 3/2022 | Demers | G06V 10/774 |
| 11,423,256 B2* | 8/2022 | Marie-Nelly | G06N 3/047 |
| 11,868,440 B1* | 1/2024 | Patel | G06F 17/18 |
| 11,922,613 B2* | 3/2024 | Gong | G06V 10/776 |
| 11,960,574 B2* | 4/2024 | Mittal | G06F 18/2431 |
| 12,394,224 B2* | 8/2025 | Wilkinson, Jr. | G06V 10/82 |
| 2016/0321523 A1* | 11/2016 | Sen | G06V 10/774 |
| 2017/0228645 A1* | 8/2017 | Wang | G06N 3/084 |
| 2019/0228522 A1* | 7/2019 | Shinoda | G06T 7/001 |
| 2021/0012156 A1* | 1/2021 | Vijaykeerthy | G06N 3/084 |
| 2021/0089941 A1* | 3/2021 | Chen | G06N 5/04 |
| 2021/0089964 A1* | 3/2021 | Zhang | G06V 10/776 |
| 2021/0325308 A1* | 10/2021 | Kannan | G01N 21/6458 |

(Continued)

FOREIGN PATENT DOCUMENTS

JP    2019-129169 A    8/2019

Primary Examiner — Manav Seth
(74) Attorney, Agent, or Firm — Rimon P.C.

(57) ABSTRACT

A training device includes a data acquirer that acquires training data including a first image of a first type and a second image of a second type that is different from the first type, a first trainer that repeats an epoch for causing the first image and the second image to be learned under a same condition multiple times, and a second trainer that repeats an epoch for training a trained learning model generated by the first trainer with a rate of error back-propagation in regard to the first image and a rate of error back-propagation in regard to the second image being made different from each other.

9 Claims, 11 Drawing Sheets

(56) References Cited

U.S. PATENT DOCUMENTS

| | | |
|---|---|---|
| 2022/0028088 A1 | 1/2022 | Bui et al. |
| 2022/0036548 A1 | 2/2022 | Hu |
| 2022/0067902 A1* | 3/2022 | Dou ........................ G06F 18/24 |
| 2022/0092366 A1* | 3/2022 | Chiu ....................... G06N 20/00 |
| 2022/0148157 A1 | 5/2022 | Prasad et al. |
| 2023/0267334 A1* | 8/2023 | Merrill ................... G06N 3/084 |
| | | 706/25 |
| 2023/0274527 A1* | 8/2023 | Chen ................... G06V 10/764 |
| | | 382/181 |
| 2023/0351192 A1* | 11/2023 | Zhang ................... G06N 20/00 |
| 2024/0144081 A1* | 5/2024 | Jana ........................ G06N 3/08 |

* cited by examiner

FIG. 5

|  | DEFECTIVE | NON-DEFECTIVE |
|---|---|---|
| DEFECT IMAGE | 85% | 15% |
| FALSE REPORT IMAGE | 13% | 87% |

F I G. 7

|  | DEFECTIVE | NON-DEFECTIVE |
|---|---|---|
| DEFECT IMAGE | 99.92% | 0.08% |
| FALSE REPORT IMAGE | 15% | 85% |

TRAINING DEVICE, TRAINING METHOD AND NON-TRANSITORY COMPUTER READABLE MEDIUM STORING TRAINING PROGRAM

CROSS REFERENCE TO RELATED APPLICATIONS

This application claims the benefits of Japanese Application No. 2022-153036, filed on Sep. 26, 2022, the entire contents of which are hereby incorporated by reference.

BACKGROUND

Technical Field

The present invention relates to a training device, a training method and a non-transitory computer readable medium storing a training program.

Description of Related Art

In the procedure for manufacturing a semiconductor device, a liquid crystal display or the like, various processes are performed on a substrate such as a semiconductor wafer or a glass substrate. Further, an inspection device is used to inspect a substrate that has been subjected to various processes. The inspection device is provided in a substrate processing apparatus together with a plurality of processing units that perform processes on substrates, for example.

As one example of an inspection device, JP 2019-129169 A describes an image evaluation device that detects a defect by using a design data image obtained when design data is imaged as a teacher, creating a model for generating a design data image based on a corresponding image to be inspected by using the image to be inspected, predicting a design data image based on the image to be inspected by using the created model and comparing a design data prediction image obtained when the design data corresponding to the image to be inspected is imaged with the design data image that is predicated based on the image to be inspected.

SUMMARY

In regard to a substrate in which a defect is detected by the inspection device, an inspector may determine that the substrate has a defect or may determine that the substrate does not have a defect, as a result of inspection. It is possible to reduce a burden on the inspector by reducing false reports provided by the inspection device.

For this purpose, it is necessary to reduce the probability that a substrate having a defect is determined not to be defective by the inspection device before the substrate is determined to be defective by the inspector, as much as possible. In order to reduce this probability, although it is conceivable to increase the number of trainings in the image evaluation device, there is a problem that the inference accuracy is degraded due to over-training.

An object of the present invention is to provide a training device and a training method that enable generation of a learning model that has improved inference accuracy in regard to a specific type of an image selected from among a plurality of types of images as compared to inference accuracy of other types of images while preventing over-training, and a non-transitory computer readable medium storing a training program that enables generation of a learning model that has improved inference accuracy in regard to a specific type of an image selected from among a plurality of types of images as compared to other types of images while preventing over-training.

(1) A training device according to one aspect of the present invention includes a data acquirer that acquires training data including a first image of a first type and a second image of a second type that is different from the first type, a first trainer that repeats an epoch for causing the first image and the second image to be learned under a same condition multiple times, and a second trainer that repeats an epoch for training a trained learning model generated by the first trainer with a rate of error back-propagation in regard to the first image and a rate of error back-propagation in regard to the second image being made different from each other.

(2) A training method according to another aspect of the present invention includes a data acquiring step of acquiring training data including a first image of a first type and a second image of a second type that is different from the first type, a first training step of repeating an epoch for causing the first image and the second image to be learned under a same condition multiple times, and a second training step of repeating an epoch for training a trained learning model generated in the first training step with a rate of error back-propagation in regard to the first image and a rate of error back-propagation in regard to the second image being made different from each other.

(3) A non-transitory computer readable medium storing a training program according to yet another aspect of the present invention causes a computer to execute a data acquiring step of acquiring training data including a first image of a first type and a second image of a second type that is different from the first type, a first training step of repeating an epoch for causing the first image and the second image to be learned under a same condition multiple times, and a second training step of repeating an epoch for training a trained learning model generated in the first training step with a rate of error back-propagation in regard to the first image and a rate of error back-propagation in regard to the second image being made different from each other.

It is possible to generate a learning model having improved inference accuracy in regard to a specific type of image selected from among a plurality of types of images as compared to other types of images while preventing over-training.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 5 is a diagram showing one example of an evaluation result in regard to a first trained model;

FIG. 7 is a diagram showing one example of an evaluation result in regard to a second trained model;

DETAILED DESCRIPTION

A training device, a training method and a non-transitory computer readable medium storing a training program according to one embodiment of the present invention will be described below with reference to the drawings. In the following description, a substrate refers to a semiconductor substrate, a substrate for an FPD (Flat Panel Display) such as a liquid crystal display device or an organic EL (Electro Luminescence) display device, a substrate for an optical disc, a substrate for a magnetic disc, a substrate for a magneto-optical disc, a substrate for a photomask, a ceramic substrate, a substrate for a solar cell, or the like.

1. Configuration of Substrate Processing System

Figure 1:
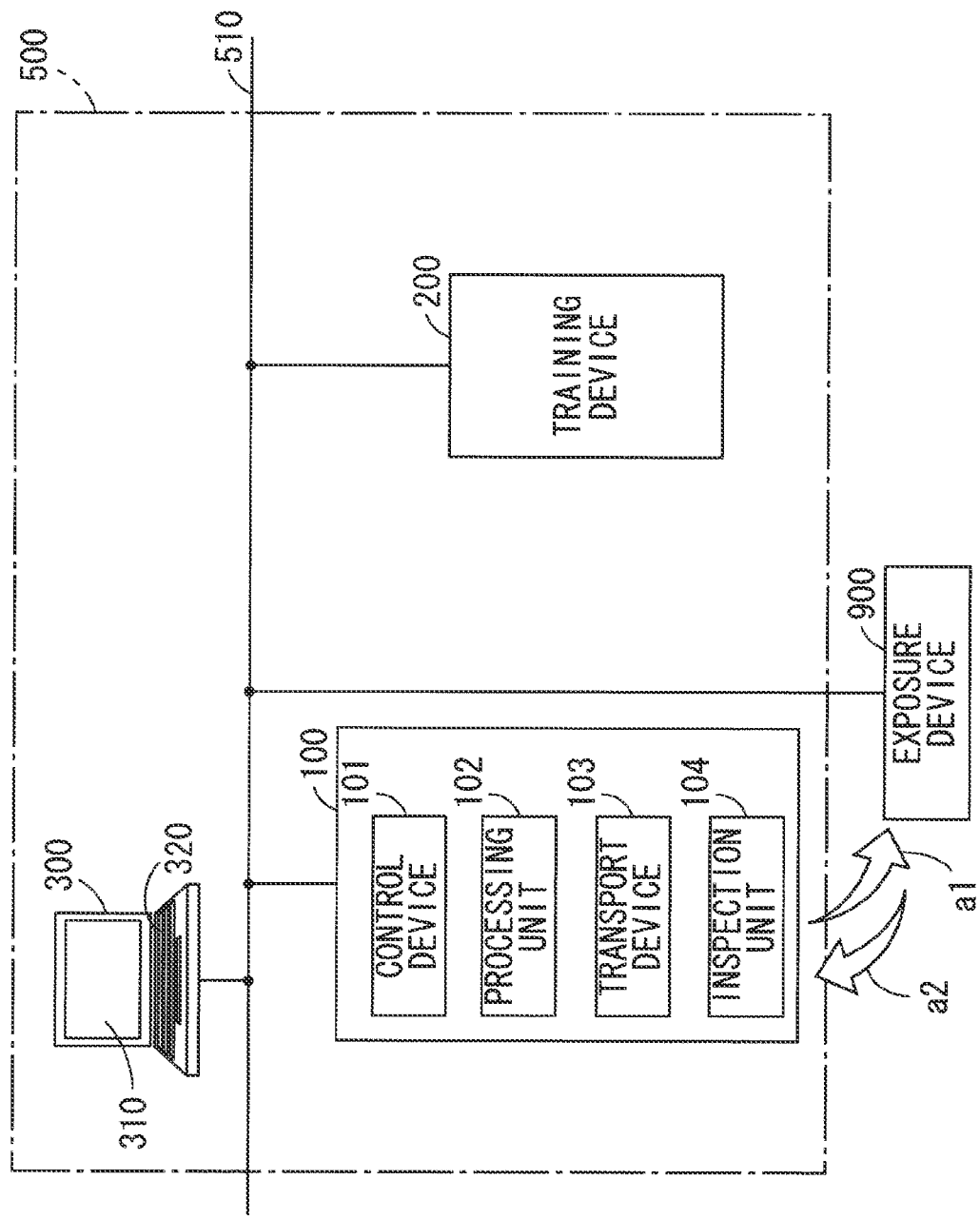
FIG. 1 is a block diagram showing the configuration of a substrate processing system according to one embodiment of the present invention.

FIG. 1 is a block diagram showing the configuration of a substrate processing system according to one embodiment of the present invention. As shown in FIG. 1, the substrate processing system 500 includes a substrate processing apparatus 100, a training device 200 and a management device 300. The substrate processing apparatus 100, the training device 20 and the management device 300 are connected to a network 510 so as to be communicable with one another. While the one substrate processing apparatus 100 and the one management device 300 are provided in the present embodiment, a plurality of substrate processing apparatuses 100 and a plurality of management devices 300 may be provided.

The substrate processing apparatus 100 includes a control device 101, one or a plurality of processing units 102, one or a plurality of transport devices (transporting robots) 103 and one or a plurality of inspection units 104. In FIG. 1, the one processing unit 102, the one transport device 103 and the one inspection unit 104 are shown as the configuration of the substrate processing apparatus 100. The substrate processing apparatus 100 according to the present embodiment is used together with an exposure device 900 corresponding to the substrate processing apparatus 100.

The one or plurality of processing units 102 perform a predetermined process such as a process of applying a processing liquid, a process of adjusting a temperature or a development process on a substrate. More specifically, the one or plurality of processing units 102 according to the present embodiment include a coating processing unit, a temperature adjustment unit and a development processing unit. The coating processing unit is a unit that forms a resist film on one surface of a substrate. In the present embodiment, one surface of a substrate means a main surface (circuit formation surface) of the substrate. The temperature adjustment unit is a unit that adjusts the temperature of a substrate by heating or cooling the substrate. The development processing unit is a unit that performs a development process on a substrate on which a resist film has been formed and on which an exposure process has been performed.

In this case, in the substrate processing apparatus 100, a resist film is formed on an unprocessed substrate that has been carried in by the coating processing unit, for example. The substrate on which a resist film has been formed is transferred to the exposure device 900 as indicated by the outlined arrow a1 in FIG. 1. In the exposure device 900, an exposure process is performed on a substrate. The substrate on which the exposure process has been performed is returned from the exposure device 900 to the substrate processing apparatus 100 as indicated by the outlined arrow a2 in FIG. 1. A development process is performed by the development processing unit on the substrate that has been returned to the substrate processing apparatus 100.

The transport device 103 transports a substrate among the one or plurality of processing units 102, the one or plurality of inspection units 104 and an external device (such as the exposure device 900) of the substrate processing apparatus 100.

The inspection unit 104 performs an appearance inspection of a substrate after a process performed by the one or plurality of processing units 102 (after the development process in the present example) based on an inspection recipe representing a substrate inspection condition. The inspection unit 104 includes an imaging device (not shown). In the appearance inspection of a substrate, the presence or absence of a defect in regard to the appearance of the substrate is determined with use of a substrate image obtained when an image of the substrate is picked up. Hereinafter, a substrate image determined to be defective in regard to the appearance of a substrate by the inspection unit 104 is referred to as an NG image. An NG image is transmitted to the training device 200.

The control device 101 includes a CPU (Central Processing Unit) and a memory, or a microcomputer, for example, and controls the operation of each of the constituent elements (102 to 104) of the substrate processing apparatus 100 including the control device 101.

The management device 300 is a personal computer, for example, and includes a display 310 and an operation unit 320 as well as a CPU and a memory. The management device 300 instructs each of the substrate processing apparatus 100 and the exposure device 900 corresponding to each other to start a substrate process, for example, based on an operation performed by a user on the operation unit 320.

2. Configuration of Training Device

The training device 200 generates a learning model for determining the authenticity of an inspection result provided by the inspection unit 104 by learning an NG image obtained when an image of a substrate determined to be defective by the inspection unit 104 is picked up.

Figure 2:
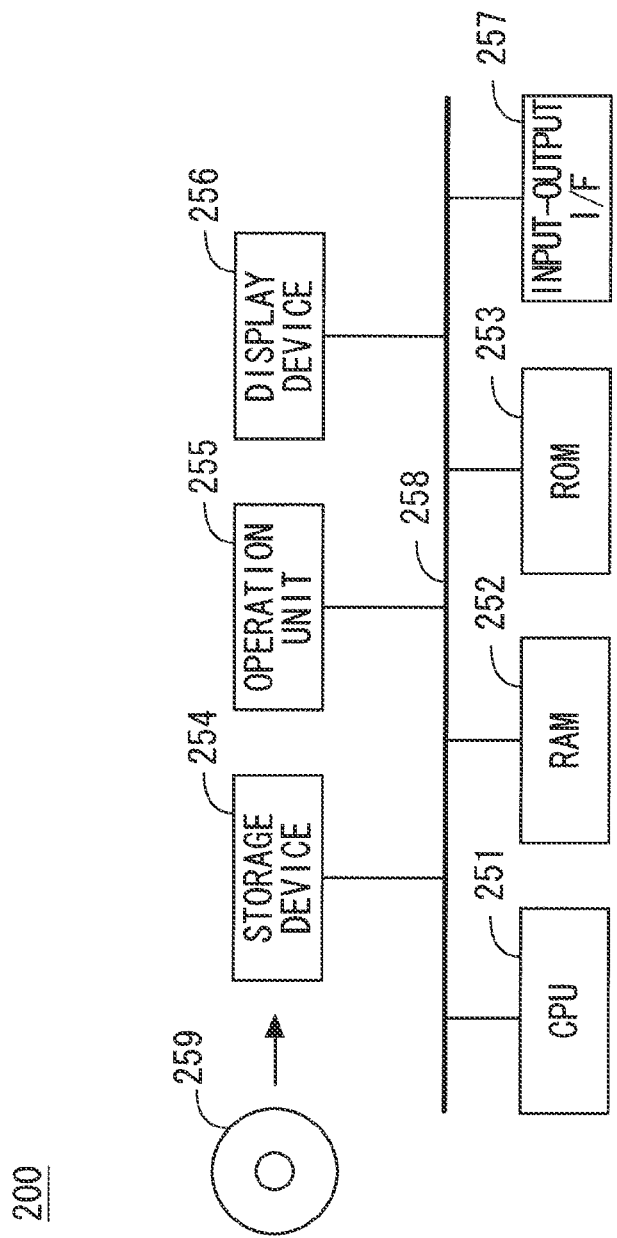
FIG. 2 is a diagram showing one example of the configuration of a training device.

FIG. 2 is a diagram showing one example of the configuration of a training device. With reference to FIG. 2, the training device 200 is constituted by a CPU 251, a RAM (Random Access Memory) 252, a ROM (Read Only Memory) 253, a storage device 254, an operation unit 255, a display device 256 and an input-output I/F 257. The CPU 251, the RAM 252, the ROM 253, the storage device 254, the operation unit 255, the display device 256 and the input-output I/F 107 are connected to a bus 258.

The RAM 252 is used as a work area for the CPU 251. A system program is stored in the ROM 253. The storage device 254 includes a storage medium such as a hard disc or a semiconductor memory and stores various programs. Various programs may be stored in the ROM 253 or another external storage device. A CD-ROM (Compact Disc-ROM) 259 is attachable to and detachable from the storage device 254. The operation unit 255 is an input device such as a keyboard, a mouse or a touch panel. The input-output I/F 257 is connected to the network. The display device 256 displays various images.

In general, in regard to a substrate determined to be defective by the inspection unit 104, an inspector visually checks an NG image to determine whether the substrate is defective. In this case, the result may be different from the result representing presence of a defect by the inspection unit 104. In other words, the inspector inspects whether a determination result provided by the inspection unit 104 is correct in regard to a substrate determined to be defective by the inspection unit 104. Hereinafter, an NG image of a substrate determined to be defective by the inspector is referred to as a defect image, and an NG image of a substrate determined to be non-defective by the inspector is referred to as a false report image. In this manner, an NG image is classified into either a defect image or a false report image depending on an inspection result of a substrate provided by the inspector. This classifying work imposes a heavy burden on the inspector.

In order to reduce a burden on the inspector, it is desired to reduce the number of false report images among the NG images determined to be defective by the inspection unit 104 before the inspector performs inspection, without increasing the accuracy of the inspection unit 104.

Figure 3:
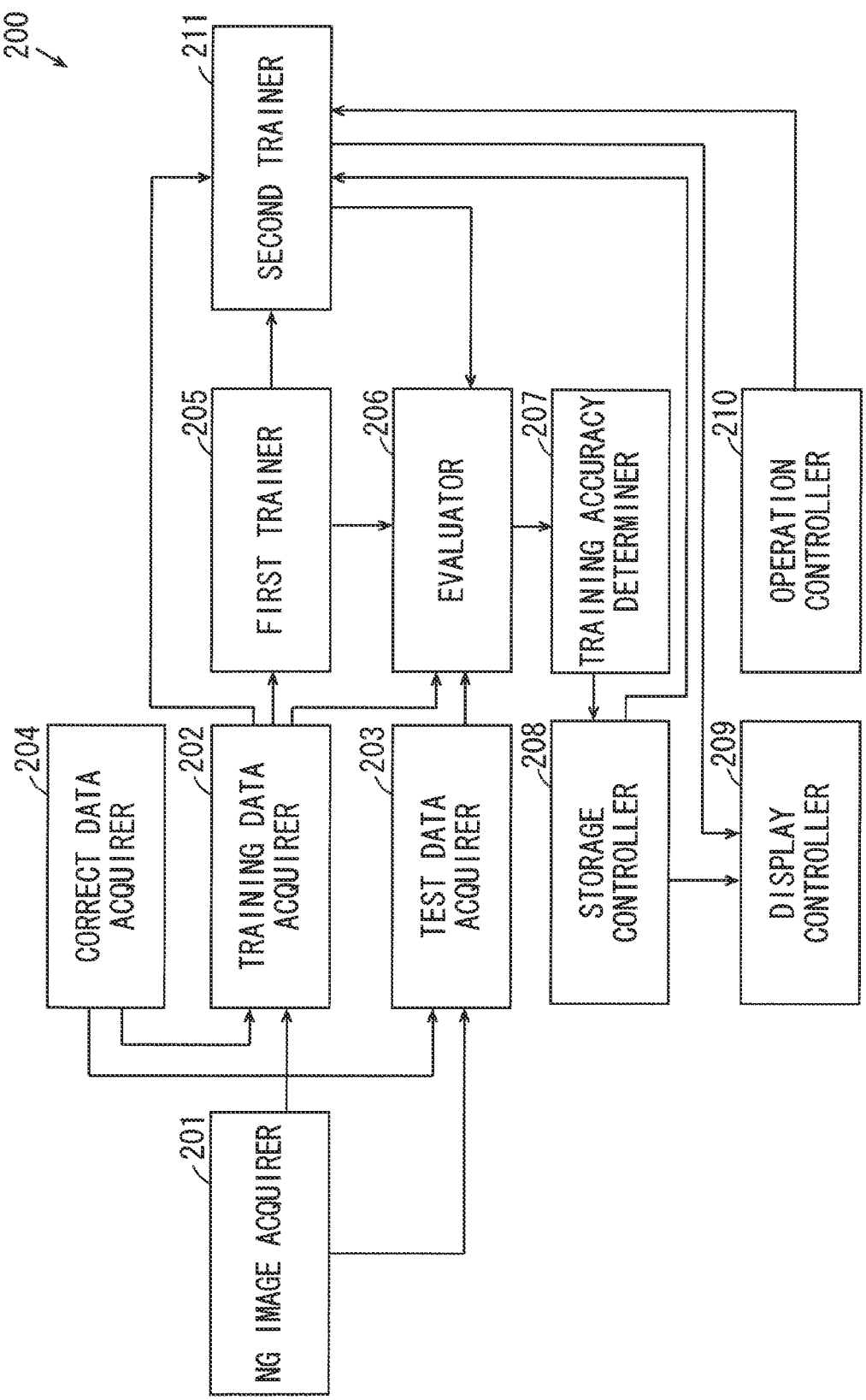
FIG. 3 is a diagram showing one example of the functional configuration of the training device in one embodiment of the present invention.

FIG. 3 is a diagram showing one example of the functional configuration of the training device in one embodiment of the present invention. The functions shown in FIG. 3 are implemented by execution of the training program stored in the ROM 253 or the CD-ROM 259 by the CPU 251 included in the training device 200. The training device 200 includes an NG image acquirer 201, a training data acquirer 202, a test data acquirer 203, a correct data acquirer 204, a first trainer 205, an evaluator 206, a training accuracy determiner 207, a storage controller 208, a display controller 209, an operation controller 210 and a second trainer 211.

The NG image acquirer 201 controls the input-output I/F 257 to acquire an NG image transmitted from the inspection unit 104. As described above, an NG image is an image obtained when an image of a substrate determined to be defective by the inspection unit 104 is picked up. An NG image is associated with substrate identification information for identifying a substrate. Further, in a case in which an NG image is stored in the CD-ROM 259 by the inspection unit 104, the NG image acquirer 201 controls the storage device 254 to read the NG image from the CD-ROM 259 mounted to the storage device 254.

The correct data acquirer 204 acquires a determination result provided by the inspector in regard to each NG image acquired by the NG image acquirer 201. The determination result provided by the inspector is associated with substrate identification information for identifying a substrate to be inspected. In a case in which the CD-ROM 259 storing a determination result provided by the inspector is mounted to the storage device 254, the correct data acquirer 204 controls the storage device 254 to read the determination result provided by the inspector from the CD-ROM 259. Further, the correct data acquirer 204 may control the input-output I/F 257 to receive a determination result provided by the inspector from a personal computer to be operated by the inspector. In the present embodiment, the number of NG images to be processed by the training device 200 is 1000.

The training data acquirer 202 acquires at least part of NG images acquired by the NG image acquirer 201. The training data acquirer 202 generates training data in which an acquired NG image is labeled as an image showing no defect or a defect based on a determination result acquired by the correct data acquirer 204. The training data generated by the training data acquirer 202 includes a false report image which is an NG image labeled as an image showing no defect and a defect image which is an NG image labeled as an image showing a defect. In the present embodiment, the number of false report images included in the training data is the same as the number of defect images. In the present embodiment, the training data includes 800 NG images, and the 800 NG images include 400 defect images and 400 false report images. The number of false report images and the number of defect images included in the training data may be different from each other.

The test data acquirer 203 acquires an NG image different from an NG image acquired by the training data acquirer 202 among NG images acquired by the NG image acquirer 201 as test data. The test data acquirer 203 generates test data in which an NG image is labeled as an image showing a defect or no defect based on a determination result acquired by the correct data acquirer 204. The test data generated by the test data acquirer 203 includes a false report image which is an NG image labeled as an image showing no defect and a defect image which is an NG image labeled as an image showing a defect. In the present embodiment, the number of false report images included in the test data is the same as the number of defect images included in the test data. In the present embodiment, the test data includes 200 NG images, and the 200 NG images include 100 defect images and 100 false report images. The number of false report images and the number of defect images included in the training data may be different from each other.

The first trainer 205 performs machine learning (supervised learning) on a first learning model such as a convolutional neural network by using the training data acquired by the training data acquirer 202.

Figure 4:
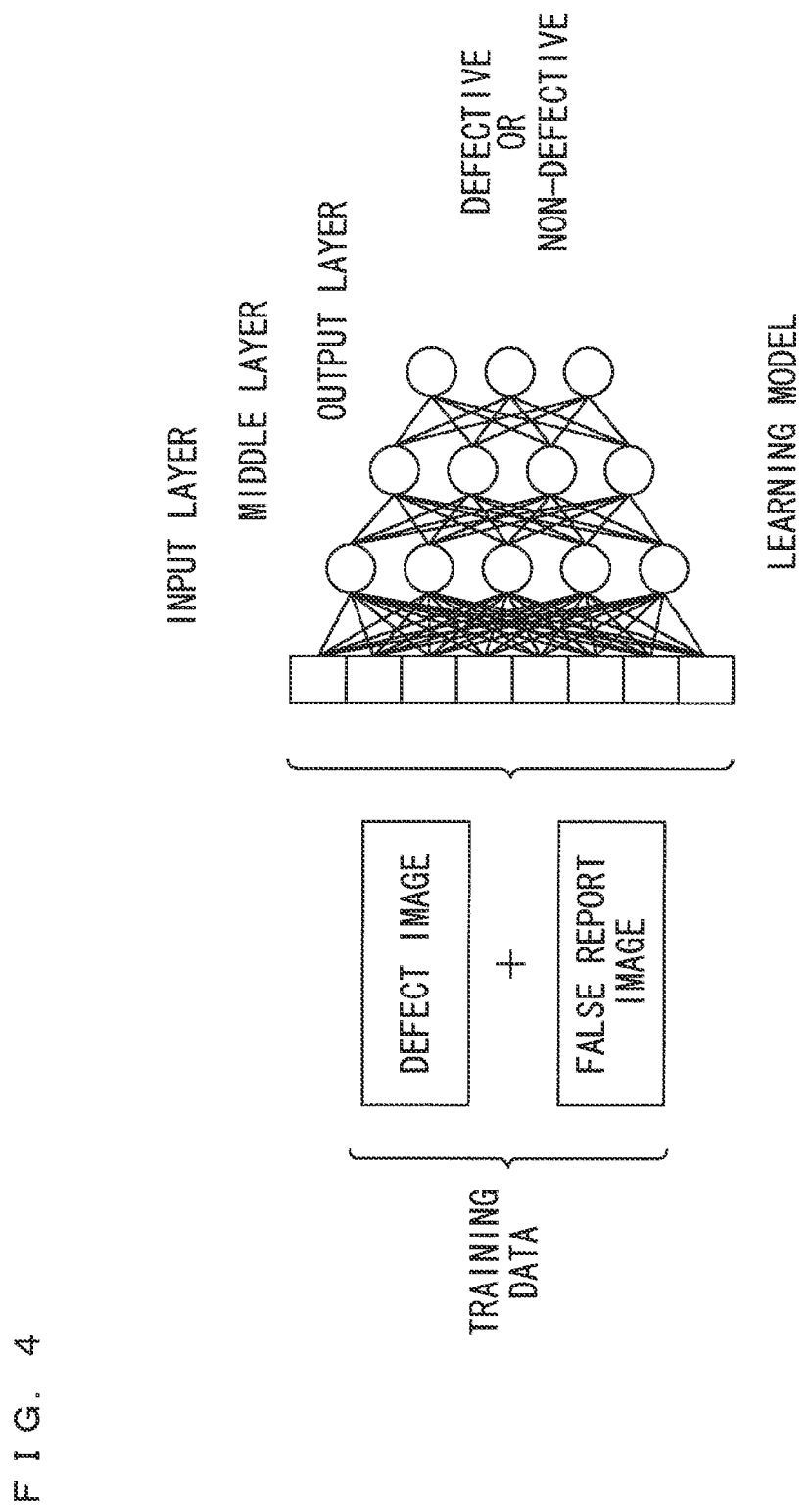
FIG. 4 is a diagram for explaining one example of a learning model.

FIG. 4 is a diagram for explaining one example of a learning model. With reference to FIG. 4, the learning model includes an input layer, a middle layer and an output layer, and each layer includes a plurality of nodes indicated by circles. While one middle layer is shown in the diagram, the number of middle layers may be larger than this. Also, although five nodes are shown in the input layer, four nodes are in the middle layer, and three nodes are in the output layer, the number of nodes is not limited to this. The output of an upper node is connected to the input of a lower node. A parameter includes a coefficient for weighting the output of an upper node.

When inspection image data is input to a trained learning model, an inference result is output. In a training stage, in a case in which the training data represents a false report image, an NG image included in the training data and teaching data representing an image showing no defect included in the training data are provided to the learning model. Further, in the training stage, in a case in which the training data represents a false report image, an NG image included in the training data and teaching data representing an image showing a defect included in the training data are provided to the learning model. The learning model sequentially learns a plurality of training data pieces, so that the parameter of each of a plurality of nodes is optimized. A training operation of causing a learning model to sequentially learn a plurality of training data pieces by the number of training data pieces is referred to as an epoch. Training accuracy of a learning model is improved when an epoch is repeated multiple times. Hereinafter, the number of times an epoch is repeated is referred to as an epoch training count.

More specifically, in the training performed in an epoch, a plurality of training data pieces, which is 800 training data pieces here, are respectively provided to a learning model. The difference between an inference result inferred by the learning model based on training data, and teaching data is calculated as an error. Then, the parameter of each of a plurality of nodes is updated with use of an error back-propagation method such that this error is reduced.

Parameters defined for each of a plurality of nodes included in the learning model are adjusted such that an error is reduced. Specifically, the gradient of a loss function is obtained, and the parameters are updated such that an error is further reduced. A value representing the degree of this update is the rate at which an error is back-propagated. The smaller the rate of error back-propagation, the smaller the value representing the degree of update of a weight parameter.

The rate of error back-propagation represents the degree of update of a parameter. The larger the rate of error back-propagation, the larger the degree of update of a parameter. The smaller the rate of error back-propagation, the smaller the degree of update of a parameter.

Returning to FIG. 3, when the first trainer 205 causes a learning model to learn, the rate of error back-propagation in regard to a defect image and the rate of error back-propagation in regard to a false report image are set to the same value. Hereinafter, a first learning model that has completed training by an epoch training count is referred to as a first trained model.

The evaluator 206 evaluates the first trained model generated by the first trainer 205 after the training in an epoch by the first trainer 205 by using test data acquired by the test data acquirer 203. Specifically, the evaluator 206 inputs the test data to the first trained model, and calculates an evaluation result obtained when an inference result provided by the first trained model is aggregated. The evaluation result includes the ratio of an inference result inferring presence of a defect in regard to a false report image, the ratio of an inference result inferring absence of a defect in regard to a false report image, the ratio of an inference result inferring presence of a defect in regard to a defect image and the ratio of an inference result inferring absence of a defect in regard to a defect image.

FIG. 5 is a diagram showing one example of an evaluation result in regard to a first trained model. In the evaluation result in regard to the first trained model in FIG. 5, the ratio (85%) of an inference result inferring presence of a defect in regard to a defect image is shown in the upper left field, and the ratio (15%) of an inference result inferring absence of a defect in regard to a defect image is shown in the upper right field. The sum of the ratio of an inference result inferring presence of a defect in regard to a defect image and the ratio of an inference result inferring absence of a defect in regard to a defect image is 100%. Further, the ratio (13%) of an inference result inferring presence of a defect in regard to a false report image is shown in the lower left field, and the ratio (87%) of an inference result inferring absence of a defect in regard to a false report image is shown in the lower right field. The sum of the ratio of an inference result inferring presence of a defect in regard to a false report image and the ratio of an inference result inferring absence of a defect in regard to a false report image is 100%.

It can be said that the higher the ratio (85%) of an inference result inferring presence of a defect in regard to a defect image and the ratio (87%) of an inference result inferring absence of a defect in regard to a false report image, the more progressed the training of a learning model.

Returning to FIG. 3, similarly to the evaluation with use of test data, the evaluator 206 evaluates the first trained model generated by the first trainer 205 after the training in an epoch by the first trainer 205, by using the training data acquired by the training data acquirer 202. Specifically, the evaluator 206 inputs the training data to the first trained model and acquires an evaluation result obtained when an inference result provided by the first trained model is aggregated.

The training accuracy determiner 207 determines the training accuracy based on an evaluation result calculated by the evaluator 206 in regard to the first trained model each time training of an epoch training count is completed by the first trainer 205. In the present embodiment, the training accuracy determiner 207 determines the ratio of an inference result inferring presence of a defect in regard to a defect image as training accuracy. The training accuracy determiner 207 may determine the ratio of an inference result inferring absence of a defect in regard to a false report image as training accuracy, or may calculate the average value of the ratio of an inference result inferring presence of a defect in regard to a defect image and the ratio of an inference result inferring absence of a defect in regard to a false report image as training accuracy.

Each time training of an epoch training count is completed by the first trainer 205, the storage controller 208 stores an epoch training count, and a set of a first trained model, training accuracy in regard to training data and training accuracy in regard to test data, in the storage device 254. The first trainer 205 repeats training until an epoch training count reaches a predetermined count. In the present embodiment, the predetermined count is 120.

The display controller 209 displays a graph representing a change in training accuracy on the display device 256 based on a set of the training accuracy in regard to the training data and the training accuracy in regard to the test data, which are stored in the storage controller 208 for each epoch training count.

Figure 6:
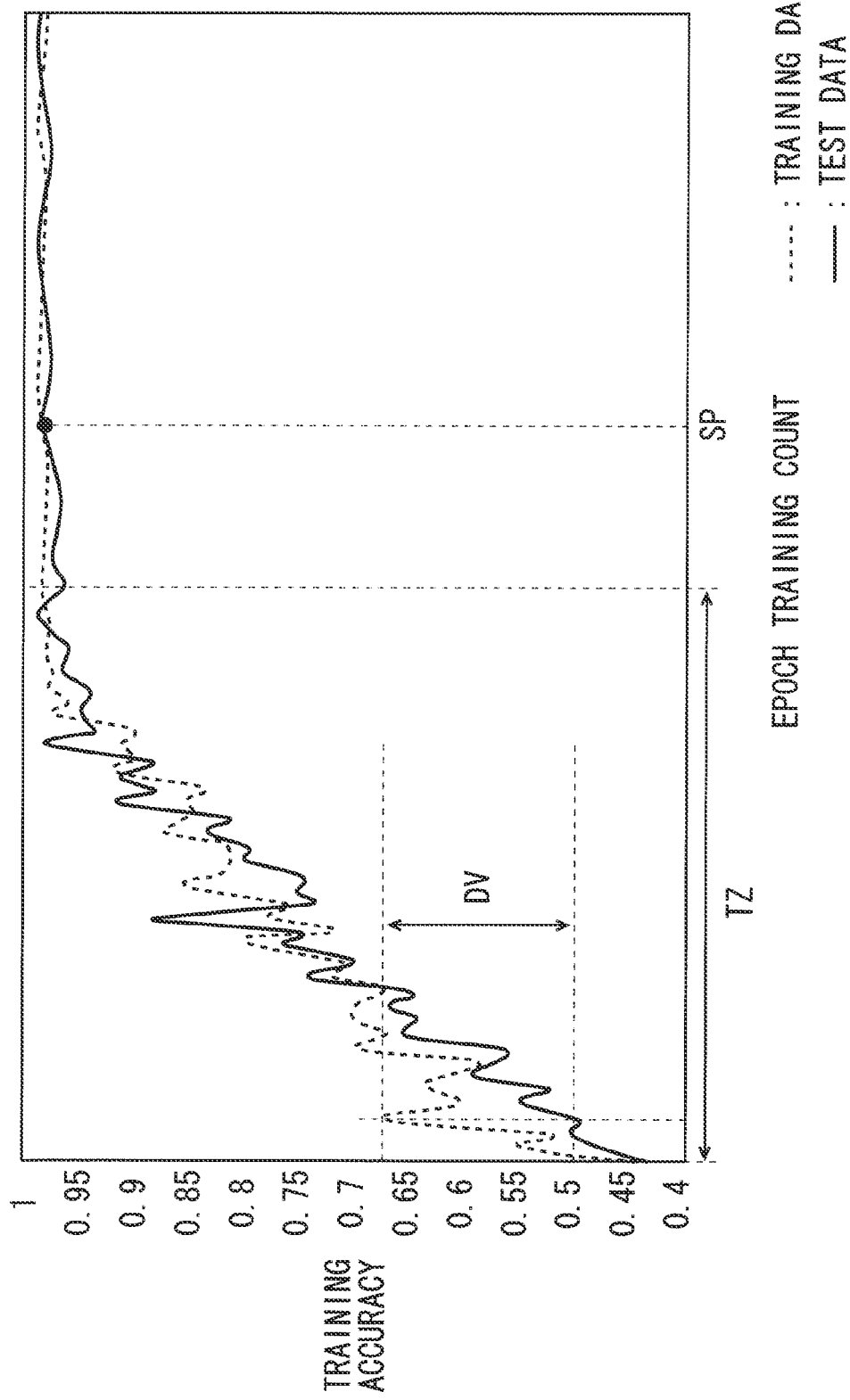
FIG. 6 is a diagram showing one example of a graph showing the training accuracy for each epoch training count.

FIG. 6 is a diagram showing one example of a graph showing the training accuracy for each epoch training count. In the graph of FIG. 6, the ordinate represents training accuracy, and the abscissa represents an epoch training count. In the graph of FIG. 6, a change in training accuracy of the first trained model in regard to the training data is indicated by the dotted line, and a change in training accuracy of the first trained model in regard to the test data is indicated by the solid line.

As shown in FIG. 6, in a region TZ in which the epoch training count is relatively small (a period of time shorter than the half of the total training count, for example), it can be seen that the value of training accuracy tends to increase as the epoch training count increases. This means that the first trained model has been trained insufficiently. On the other hand, in a region where the epoch training count is larger than that in the region TZ, the value of training accuracy changes in a predetermined range as the epoch training count increases. In a region where an epoch training count is larger than that in the region TZ, it can be said that the first trained model corresponding to an epoch training count that causes the training accuracy to converge to a predetermined value has appropriately completed training.

Further, in FIG. 6, a deviation DV representing the difference between the training accuracy of the first trained model in regard to an epoch training count and the training accuracy of the first trained model in regard to the test data is shown. In a case in which the deviation DV is large, it means that the first trained model has been trained insufficiently. On the other hand, in a case in which the deviation DV is small, it means that the first trained model has been trained appropriately. Although not shown in FIG. 6, in a case in which the epoch training count further increases, a value of training accuracy of the test data and a value of training accuracy of the training data deviate from each other. This means that the first trained model has been over-trained. Therefore, it can be said that epoch training counts having a small deviation DV in the region TZ and the subsequent regions are appropriate epoch training counts.

The user viewing the graph representing the change in training accuracy shown in FIG. 6 operates the operation unit 255 to select an appropriate first trained model from among a plurality of first trained models respectively corresponding to epoch training counts. Specifically, the user inputs an epoch training count SP corresponding to the first trained model considered to be optimum to the operation unit 255.

Referring to FIG. 3, the operation controller 210 outputs the epoch training count input by the user to the second trainer 211. Although the user selects the optimum first trained model here by way of example, an appropriate epoch training count SP may be determined based on an amount of change in training accuracy in regard to an epoch training count or a change in amount of change.

The operation controller 210 outputs the epoch training count selected by the user to the second trainer 211. In response to reception of the epoch training count SP from the operation controller 210, the second trainer 211 acquires the first trained model corresponding to the epoch training count SP from the first trainer 205 as a second learning model. The second trainer 211 performs machine learning with use of the second learning model.

Specifically, the second trainer 211 repeats an epoch in which the first trained model acquired from the first trainer 205 learns a plurality training data pieces, which are 800 training data pieces here. Hereinafter, the second learning model, which the second trainer 211 has caused, to complete training by an epoch training count is referred to as a second trained model.

When causing the second learning model to learn the plurality of training data pieces, the second trainer 211 makes setting such that the rate of error back-propagation in regard to a defect image and the rate of error back-propagation in regard to a false report image are different from each other. Specifically, the rate of error back-propagation in regard to a false report image is made smaller than the rate of error back-propagation in regard to a defect image. The rate of error back-propagation in regard to a false report image is multiplied by a coefficient α that is smaller than 1, and the rate of error back-propagation in regard to a defect image is not multiplied by the coefficient α.

As described above, even with the same error, the smaller the rate of the error back-propagation, the smaller the degree of update of a parameter. Therefore, the degree of update of a parameter due to learning of a defect image is larger than the degree of update of a parameter due to learning of a false report image. Therefore, it is possible to improve the training accuracy of learning of a defect image while suppressing over-training caused by learning of a false report image.

The evaluator 206 evaluates the second trained model generated by the second trainer 211 each time training in an epoch is completed by using the test data acquired by the test data acquirer 203. Specifically, the evaluator 206 inputs the test data to the second trained model, and calculates an evaluation result obtained when an inference result provided by the second trained model is aggregated. The evaluation result includes the ratio of an inference result inferring presence of a defect in regard to a false report image, the ratio of an inference result inferring absence of a defect in regard to a false report image, the ratio of an inference result inferring presence of a defect in regard to a defect image and the ratio of an inference result inferring absence of a defect in regard to a defect image.

The second trainer 211 repeats training until an epoch training count reaches a predetermined count. In the present embodiment, the predetermined count is 120.

FIG. 7 is a diagram showing one example of an evaluation result in regard to a second trained model. The evaluation result shown in FIG. 7 represents an evaluation result in regard to the second learning model that has repeated an epoch until the epoch training count reaches the predetermined count. As shown in FIG. 7, it can be seen that the probability of inference inferring absence of a defect in regard to a defect image is small.

The display controller 209 causes the display device 256 to display the evaluation result in regard to the second trained model shown in FIG. 7. In this case, the user can examine the evaluation result provided by the evaluator 206 displayed on the display device 256.

Figure 8:
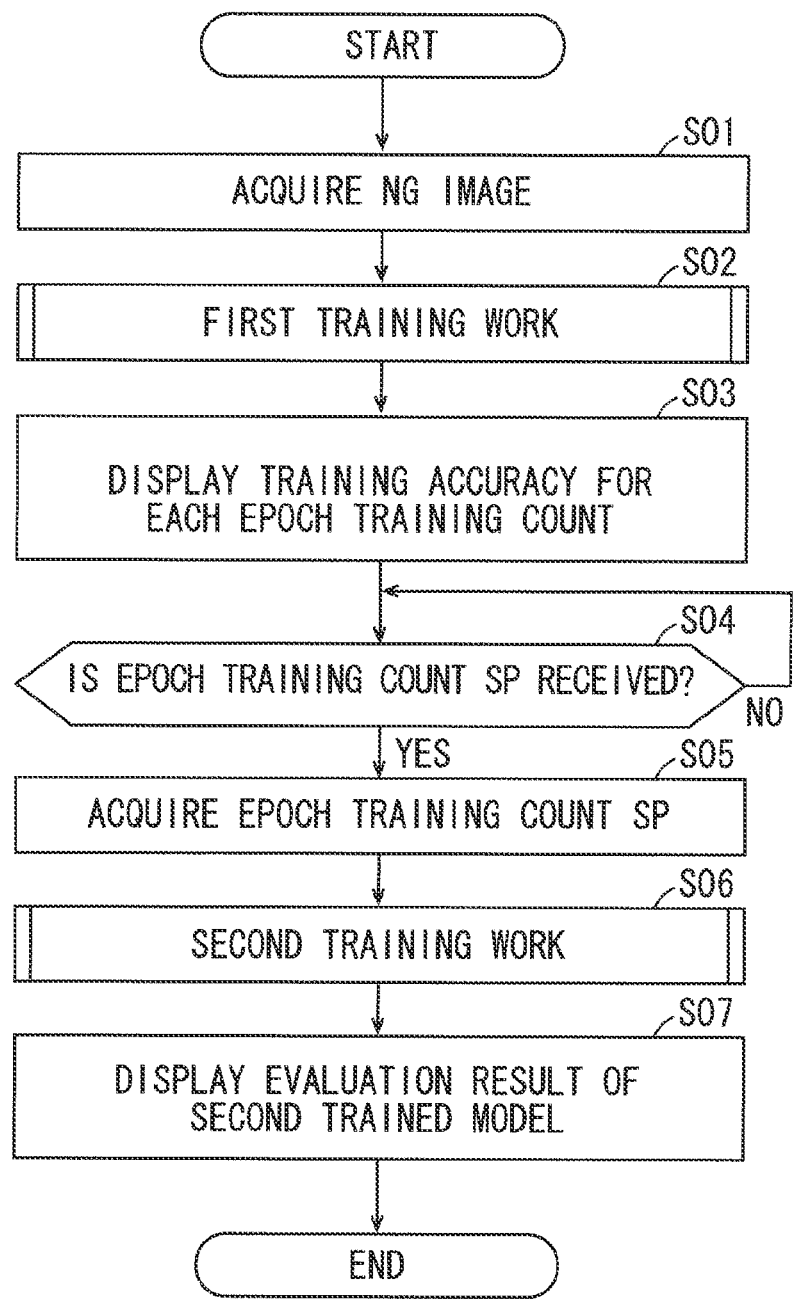
FIG. 8 is a flowchart showing one example of a flow of a training process.

FIG. 8 is a flowchart showing one example of a flow of a training process. The training process is a process executed by the CPU 251 when the CPU 251 included in the training device 200 executes a predictor generation program stored in the RAM 252. The predictor generation program is part of the training program.

With reference to FIG. 8, the CPU 251 controls the input-output I/F 257 to acquire an NG image transmitted from inspection unit 104 (step S01). In the next step S02, a first training work process is executed, and the process proceeds to the step S03. Although the details of the first training work process will be described below, the first training work process is a process of repeating an epoch with respect to the first learning model by a predetermined number of times.

In the step S03, the training accuracy is displayed on the display device 256. The training accuracy includes the training accuracy in regard to the training data and the training accuracy in regard to the test data, calculated for each epoch repetition count K, in the first training work process executed in the step S02. For example, the graph shown in FIG. 6 is displayed on the display device 256.

The CPU 251 determines whether the operation unit 255 has received an epoch training count SP (step S04). It is determined whether the operation unit 255 has received the user operation of inputting an epoch training count. In a case in which the epoch training count SP is not received (NO in the step S04), the process waits. In a case in which the epoch training count SP is received (YES in the step S04), the process proceeds to the step S05.

In the step S05, the epoch training count SP is acquired (step S05). Here, the epoch training count SP, which the user inputs to the operation unit 255, is acquired. In this stage, the first trained model obtained when the first learning model has been trained by the epoch training count SP is determined as a second learning model.

In the next step S06, a second training work process is executed, and the process proceeds to the step S07. Although the details of the second training work will be described below, the second training work is a process of repeating an epoch for causing the second learning model to learn the training data by the predetermined number of times. In the step S07, the evaluation result in regard to the second trained model that has been trained in the second training work process is displayed on the display device 256. For example, the evaluation result shown in FIG. 7 is displayed.

Figure 9:
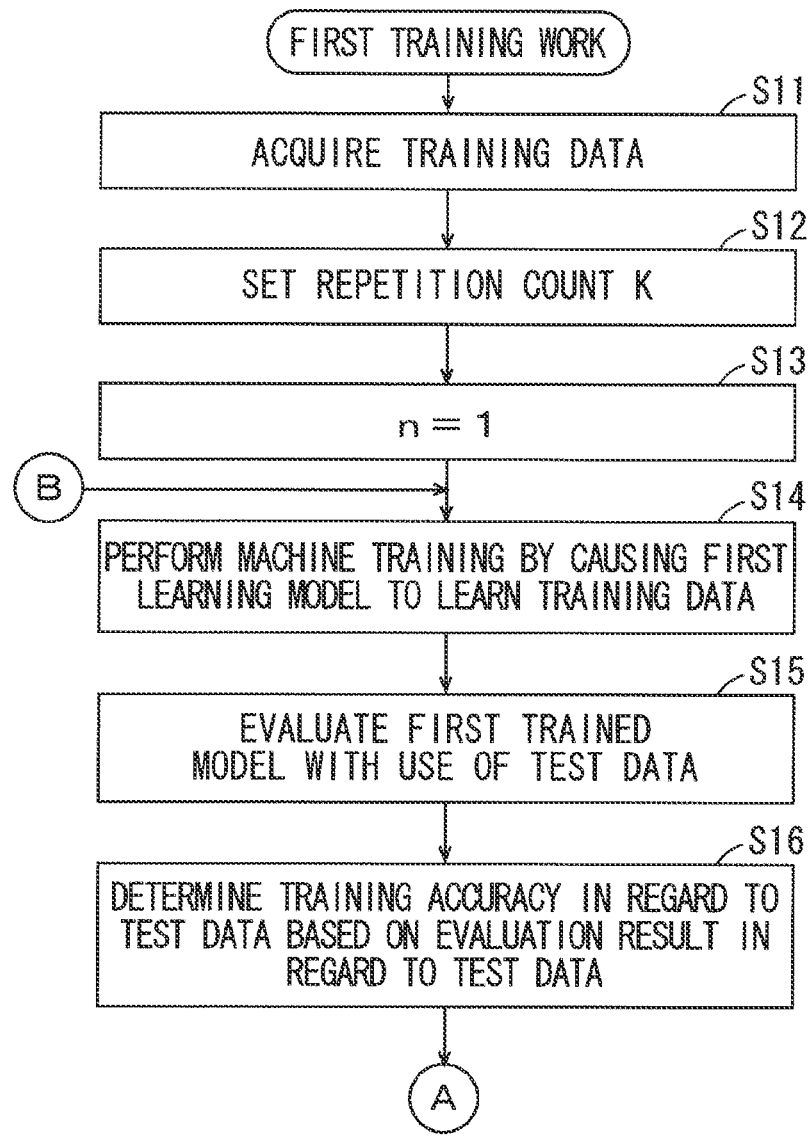
FIG. 9 is a first flowchart showing one example of a flow of a first training work process.
Figure 10:
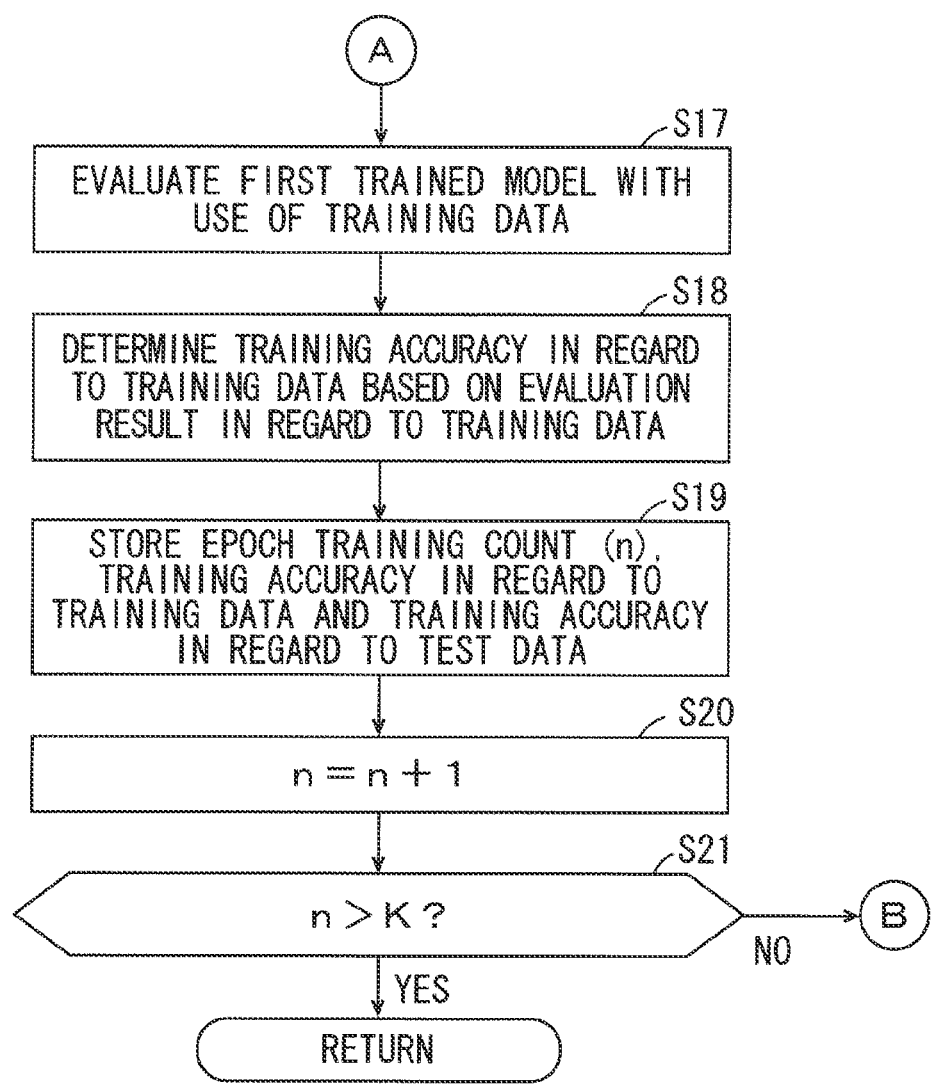
FIG. 10 is a second flowchart showing one example of a flow of the first training work process.

FIGS. 9 and 10 are flowcharts showing one example of a flow of the first training work process. The first training work process is a process executed in the step S02 of the training process shown in FIG. 8. With reference to FIGS. 9 and 10, the CPU 251 acquires the training data (step S11). In the next step S02, the repetition count K is set (step S12). The repetition count K is a value that is defined in advance as the number of times an epoch is repeated. The repetition count may be set when the user inputs the repetition count to the operation unit 255. In the next step S13, a variable n is set to 1.

In the next step S14, the CPU 251 performs machine learning to learn the training data acquired in the step S11 with use of the first learning model. In the machine training in the step S14, 800 training data pieces are learned by the first learning model. Thus, the first trained model obtained when the first learning model has repeated an epoch n times to be trained is generated.

In the next step S15, the first trained model is evaluated with use of the test data, and the process proceeds to the step S16. An evaluation result obtained when the first trained model is caused to infer respective 200 test data pieces and 200 inference results are aggregated is calculated. In the step S16, the training accuracy in regard to the test data is determined based on the evaluation result in regard to the test data.

In the next step S17, the first trained model is evaluated based on the training data, and the process proceeds to the step S18. Here, the first trained model is caused to infer respective 800 training data pieces, and an evaluation result obtained when 800 inference results are aggregated is calculated. In the step S18, the training accuracy in regard to the training data is determined based on the evaluation result in regard to the training data.

In the step S19, the epoch training count (n), the training accuracy in regard to the test data determined in the step S16 and the training accuracy in regard to the training data determined in the step S19 are stored in the storage device 254, and the process proceeds to the step S20. In the step S20, 1 is added to the variable n, and the process proceeds to the step S21. In the step S21, whether the variable n is larger than the repetition count K is determined. In a case in which the variable n is equal to or smaller than the repetition count K (NO in the step S21), the process returns to the step S14. In a case in which the variable n is larger than the repetition count K (YES in the step S21), the process returns to the training process. Therefore, in the first training work process, the process including the steps S14 to S19 is repeated by the repetition count K.

Figure 11:
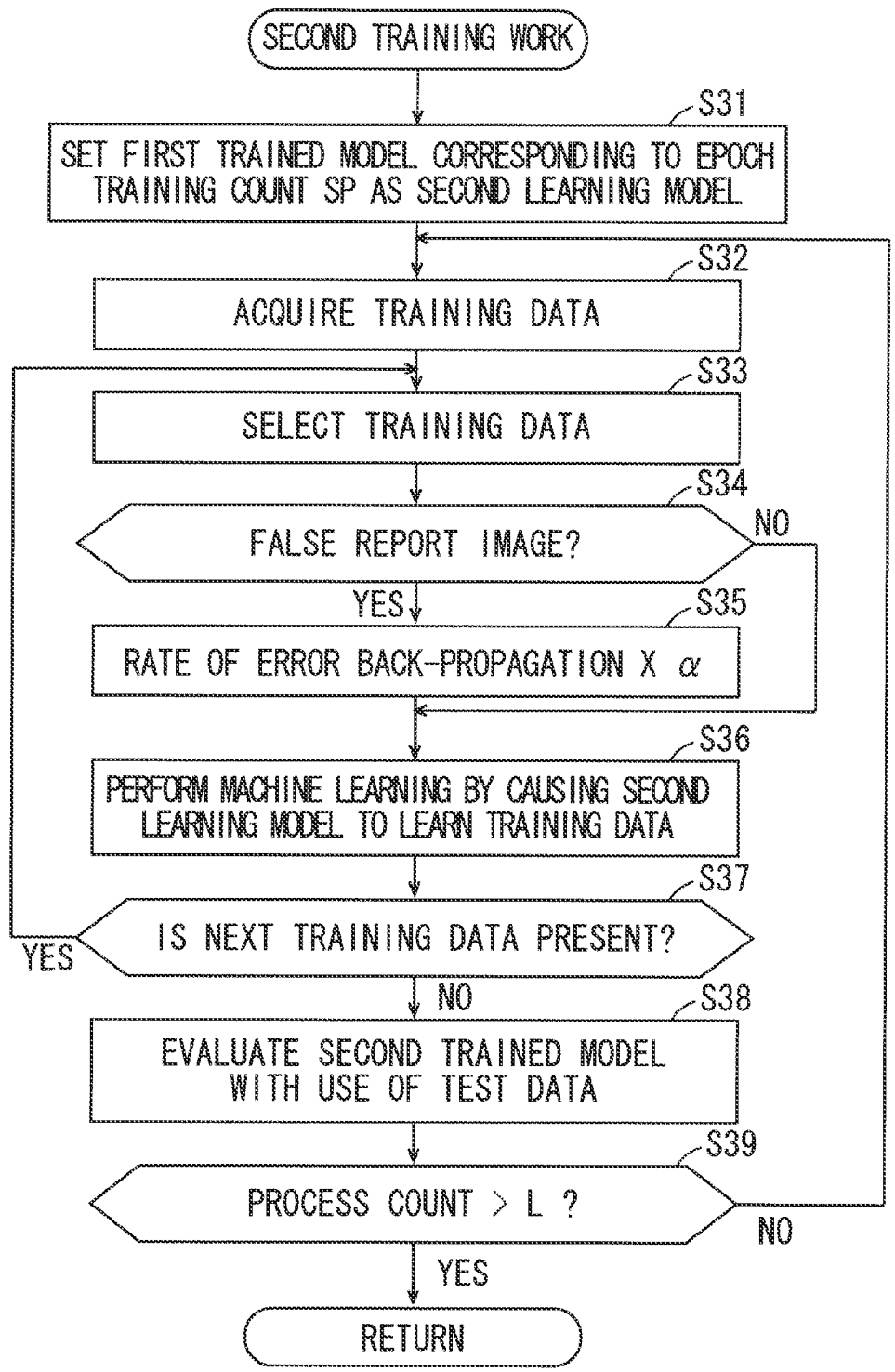
FIG. 11 is a flowchart showing one example of a flow of a second training work process.

FIG. 11 is a flowchart showing one example of a flow of a second training work process. The second training work process is a process executed in the step S06 of the training process shown in FIG. 8. Before the second training work process is executed, the epoch training count SP is determined.

With reference to FIG. 11, the first trained model corresponding to the epoch training count SP is set as the second learning model (step S31), and the process proceeds to the step S32. In step S32, the training data to be used for training is selected, and the process proceeds to the step S33. Here, the number of training data pieces is 800. One training data piece to be used for training is sequentially selected from among the 800 training data pieces.

In the step S34, it is determined whether an NG image included in the selected training data is a false report image labeled as an image showing no defect. If the image is a false report image, the process proceeds to the step S35. If not, the process skips the step S35 and proceeds to the step S36. In the step S35, the rate of error back-propagation is changed to a value obtained when the rate of error back-propagation is multiplied by a coefficient α (a coefficient that is smaller than 1), and the process proceeds to the step S36. Therefore, the rate of error back-propagation in a case in which a false report image is learned is set to a value smaller than the rate of error back-propagation in a case in which a defect image is learned.

In the step S36, the CPU 251 performs machine training to train the second learning model using the training data selected in the step S33, and the process proceeds to the step S37. In the step S37, it is determined whether training data to be selected next as training data for process is present. If unselected training data is present, the process returns to the step S33. If not, the process proceeds to the step S38. Thus, the process including the steps S33 to S36 is repeated for all of the 800 training data pieces. The second learning model that has learned the 800 training data pieces is the second trained model.

In the step S38, the second trained model is evaluated based on the test data, and the process proceeds to the step S39. The second learning model is caused to infer the respective 200 test data pieces, and an evaluation result obtained when the 200 inference results are aggregated is calculated. In the step S39, it is determined whether the number of times the process including the above-mentioned steps S32 to S38 is executed has reached a predetermined repetition count L.

When the number of times the process including the steps S32 to S38 is executed reaches the repetition count L, the process returns to the training process. If not, the process returns to the step S32. In a case in which the process returns to the training process, the second trained model that is obtained when an epoch is repeated until the epoch training count reaches the repetition count L is generated.

3. Effects of the Embodiment

In the above-mentioned embodiment, the first trained model obtained when the first trainer 205 causes a defect image and a false report image to be learned under the same condition is generated, and the first trained model is caused to learn the defect image and the false report image with the rate of error back-propagation for the defect image and the rate of error back-propagation for the false report image being made different from each other by the second trainer 211. Therefore, the first trained model generated by the first trainer 205 is a learning model that has been trained under the same influence of the defect image and the false report image. Then, the second trained model generated by the second trainer 211 is a learning model that has been trained while being influenced more by one of a defect image and a false report image than the other one of a defect image and a false report image. Therefore, it is possible to generate a learning model that has improved inference accuracy in regard to a defect image as compared to the inference accuracy in regard to a false report image, without causing over-training.

Further, because the first trainer 205 generates a first trained model that has been trained with the rate of back-propagation in regard to a defect image and the rate of back-propagation in regard to a false report image being the same, it is possible to generate the first trained model with the inference accuracy in regard to a defect image and the inference accuracy in regard to a false report image being the same.

Furthermore, because the second trainer 211 causes a second learning model to learn by making the rate of error back-propagation in regard to a false report image be smaller than the rate of error back-propagation with respect to a defect image, it is possible to make the degree of training in regard to the defect image be larger than the degree of training in regard to the false report image. Therefore, it is possible to generate a second trained model which is less probable to infer absence of a defect in regard to a defect image.

Further, because the graph of training accuracy of the first trained model shown in FIG. 6 is displayed on the display device 256 after an epoch is repeated by the first trainer 205 by the repetition count K, it is possible to cause the user to view the information which is used as a reference for selecting the first trained model of an appropriate epoch training count SP.

4. Other Embodiments

While the correct data acquirer 204 acquires a determination result provided by the inspector in regard to each NG image acquired by the NG image acquirer 201 in the above-mentioned embodiment, the present invention is not limited to this. The correct data acquirer 204 may acquire a determination result provided by another inspection device or the like in regard to each NG image acquired by the NG image acquirer 201.

(2) While being performed with use of the error back-propagation method in the above-mentioned embodiment, the first training work may be performed with use of another training method.

(3) While a first trained model acquired by the second trainer 211 is determined when the user inputs an epoch training count SP, corresponding to the first trained model, considered to be optimal based on the displayed graph of the training accuracy, the present invention is not limited to this. The first trained model acquired by the second trainer 211 may be automatically determined by the training device 200. For example, the training device 200 may automatically determine an epoch training count SP based on the change amount between the training accuracy in regard to one epoch corresponding to a training count and the training accuracy in regard to the epoch corresponding to a training count that comes next to the one epoch. In this case, the change amount is calculated in order from the epoch corresponding to a smaller training count for the training accuracy in regard to a plurality of epochs. A training count of one epoch at a point in time at which the change amount becomes smaller than a predetermined change amount is determined as an epoch training count SP. Further, the training device 200 may automatically determine an epoch training count SP based on the deviation DV representing the difference between the training accuracy of a first trained model corresponding to an epoch training count and the training accuracy of the first trained model in regard to the test data. In this case, the deviation DV is calculated in order from an epoch corresponding to a smaller training count. A training count of one epoch at a point in time at which the change amount becomes smaller than a predetermined value is determined as an epoch training count SP. Furthermore, the training device 200 may automatically determine an epoch training count at a point in time which the above-mentioned change amount becomes smaller than a predetermined first value and the deviation DV becomes smaller than a predetermined second deviation as an epoch training count SP.

(4) While the second trainer 211 repeats training until an epoch training count becomes a predetermined count in the above-mentioned embodiment, the present invention is not limited to this. An epoch repetition count for generation of a second trained model may be set by the user. Further, the user may designate an appropriate second trained model. In this case, for example, the graph showing the training accuracy for each epoch training count similar to FIG. 6 and the evaluation result shown in FIG. 7 may be displayed on the display device, and the user may determine an epoch repetition count.

Further, the second trainer 211 may end the training based on an evaluation result provided by the evaluator 206. Specifically, the second trainer 211 compares the ratio of an inference result inferring absence of a defect in regard to a defect image to an evaluation result with a threshold value. For example, the second trainer 211 may end the training in a case in which the ratio of an inference result inferring absence of a defect in regard to a defect image is equal to or smaller than a threshold value.

(5) While the first trainer 205 repeats an epoch by the predetermined repetition count K in the above-mentioned embodiment, the present invention is not limited to this. For example, the number of times the first trainer 205 repeats an epoch may be automatically determined. For example, the first trainer 205 may determine the number of times the first trainer 205 repeats an epoch based on the evaluation result calculated by the evaluator 206. In this case, for example, the table that associates the ratio of an inference result inferring presence of a defect in regard to a defect image with the number of times the first trainer 205 repeats an epoch may be prepared, and the number of times the first trainer 205 repeats an epoch may be determined based on the ratio of an inference result inferring presence of a defect in regard to a defect image with use of the table.

5. Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the defect image is an example of a first image, a false report image is an example of a second image, a first inspection result is an example of presence of a defect, and a second inspection result is an example of absence of a defect. Further, the display device 256 is an example of a display, and the first trainer 205 is an example of a count determiner.

6. Overview of Embodiments (Item 1) A training device according to one aspect of the present invention includes a data acquirer that acquires training data including a first image of a first type and a second image of a second type that is different from the first type, a first trainer that repeats an epoch for causing the first image and the second image to be learned under a same condition multiple times, and a second trainer that repeats an epoch for training a trained learning model generated by the first trainer with a rate of error back-propagation in regard to the first image and a rate of error back-propagation in regard to the second image being made different from each other.

With the training device according to item 1, a trained learning model obtained when the first image and the second image are learned under the same condition is trained with the rate of error back-propagation in regard to the first image and the rate of error back-propagation in regard to the second image being made different from each other. Therefore, the trained learning model generated by the first trainer is a learning model that has been trained under the same influence of the first image and the second image. Then, the trained learning model generated by the second trainer is a learning model that has been trained while being influenced more by one of the first image and the second image than the other one of the defect image and the false report image. Therefore, it is possible to provide a training device capable of generating a learning model that has improved inference accuracy in regard to a specific type of an image selected from among a plurality of types of images as compared to other types of images, without causing over-training.

(Item 2) The training device according to item 1, wherein the first trainer may cause the first image and the second image to be learned with a ratio of error back-propagation in regard to the first image and a ratio of error back-propagation in regard to the second image being same.

With the training device according to item 2, because the first image and the second image are learned with the rate of error back-propagation in regard to the first image and the rate of error back-propagation in regard to the second image being the same, it is possible to generate a learning model having the same inference accuracy in regard to the first image and the second image.

(Item 3) The training device according to item 1 or 2, wherein the training data may include a plurality of sets of an inspection image obtained when an image of an inspection subject is picked up as the first image, a first inspection result obtained when each inspection image is inspected by an inspection device and a second inspection result obtained when the inspection subject is inspected with a method different from the inspection device, the first image may be the inspection image the first inspection result of which represents presence of a defect and the second inspection result of which represents presence of a defect, and the second image may be the inspection image the first inspection result of which represents presence of a defect and the second inspection result of which represents absence of a defect.

With the training device according to item 3, it is possible to generate a learning model that has the larger degree of training in regard to one of a defect image and a false report image than the degree of training in regard to the other one of the defect image and the false report image.

(Item 4) The training device according to item 2, wherein the second trainer may set a value smaller than a rate of error back-propagation in regard to the first image as a rate of error back-propagation in regard to the second image.

According to the training device according to item 4, a learning model having the larger degree of training in regard to a defect image than the degree of training in regard to a false report image is generated. Therefore, it is possible to generate the learning model that is less probable to infer absence of a defect in regard to a defect image.

(Item 5) The training device according to any one of items 1 to 4, further includes a display that displays a deviation representing a difference between an evaluation result obtained when the training data is input during training to a learning model that is caused to learn by the first trainer and an evaluation result obtained when a plurality of test images obtained when images of a plurality of inspection subjects are respectively picked up are input during training to a learning model that is caused to learn by the first trainer.

With the training device according to item 5, because a deviation is displayed, it is possible to present the information for determining accuracy of inference made by the first trainer to the user.

(Item 6) The training device according to any one of items 1 to 5, may further include a count determiner that determines a training repetition count of the first trainer based on an evaluation result obtained when a plurality of test images are input during training to a learning model that is caused to learn by the first trainer, the plurality of test images being obtained when images of a plurality of inspection subjects are picked up.

According to the training device according to item 6, the number of times the first learner learns can be automatically determined.

(Item 7) The training device according to item 6, wherein the first trainer may compare a change amount of an evaluation result in regard to the repetition count with a predetermined value.

The training device according to item 7 can determine an appropriate number of times the first learner learns.

(Item 8) A training method according to another aspect of the present invention includes a data acquiring step of acquiring training data including a first image of a first type and a second image of a second type that is different from the first type, a first training step of repeating an epoch for causing the first image and the second image to be learned under a same condition multiple times, and a second training step of repeating an epoch for training a trained learning model generated in the first training step with a rate of error back-propagation in regard to the first image and a rate of error back-propagation in regard to the second image being made different from each other.

With the training method according to item 8, it is possible to generate a learning model having improved inference accuracy in regard to a specific type of an image selected from among a plurality of types of images as compared to the inference accuracy in regard to other types of images, without causing over-training.

(Item 9) A non-transitory computer readable medium storing a training program according to another aspect of the present invention causes a computer to execute a data acquiring step of acquiring training data including a first image of a first type and a second image of a second type that is different from the first type, a first training step of repeating an epoch for causing the first image and the second image to be learned under a same condition multiple times, and a second training step of repeating an epoch for training a trained learning model generated in the first training step with a rate of error back-propagation in regard to the first image and a rate of error back-propagation in regard to the second image being made different from each other.

With the training program stored in a non-transitory computer readable medium according to item 9, it is possible to generate a learning model having improved inference accuracy in regard to a specific type of an image selected from among a plurality of types of images as compared to the inference accuracy in regard to the other types of images, without causing over-training.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A training device comprising:
    a data acquirer that acquires training data including a first image of a first type and a second image of a second type that is different from the first type;
    a first trainer that repeats an epoch for causing the first image and the second image to be learned under a same condition multiple times; and
    a second trainer that repeats an epoch for training a trained learning model generated by the first trainer with a rate of error back-propagation in regard to the first image and a rate of error back-propagation in regard to the second image being made different from each other.

2. The training device according to claim 1, wherein
    the first trainer causes the first image and the second image to be learned with a ratio of error back-propagation in regard to the first image and a ratio of error back-propagation in regard to the second image being same.

3. The training device according to claim 1, wherein
    the training data includes a plurality of sets of an inspection image obtained when an image of an inspection subject is picked up as the first image, a first inspection result obtained when each inspection image is inspected by an inspection device and a second inspection result obtained when the inspection subject is inspected with a method different from the inspection device,
    the first image is the inspection image the first inspection result of which represents presence of a defect and the second inspection result of which represents presence of a defect, and
    the second image is the inspection image the first inspection result of which represents presence of a defect and the second inspection result of which represents absence of a defect.

4. The training device according to claim 2, wherein
    the second trainer sets a value smaller than a rate of error back-propagation in regard to the first image as a rate of error back-propagation in regard to the second image.

5. The training device according to claim 1, further comprising a display that displays a deviation representing a difference between an evaluation result obtained when the training data is input during training to a learning model that is caused to learn by the first trainer and an evaluation result obtained when a plurality of test images obtained when images of a plurality of inspection subjects are respectively picked up are input during training to a learning model that is caused to learn by the first trainer.

6. The training device according to claim 1, further comprising a count determiner that determines a training repetition count of the first trainer based on an evaluation result obtained when a plurality of test images are input during training to a learning model that is caused to learn by the first trainer, the plurality of test images being obtained when images of a plurality of inspection subjects are picked up.

7. The training device according to claim 6, wherein
    the first trainer compares a change amount of an evaluation result in regard to the repetition count with a predetermined value.

8. A training method including:
    a data acquiring step of acquiring training data including a first image of a first type and a second image of a second type that is different from the first type;
    a first training step of repeating an epoch for causing the first image and the second image to be learned under a same condition multiple times; and
    a second training step of repeating an epoch for training a trained learning model generated in the first training step with a rate of error back-propagation in regard to the first image and a rate of error back-propagation in regard to the second image being made different from each other.

9. A non-transitory computer readable medium storing a training program that causes a computer to execute:
    a data acquiring step of acquiring training data including a first image of a first type and a second image of a second type that is different from the first type;
    a first training step of repeating an epoch for causing the first image and the second image to be learned under a same condition multiple times; and
    a second training step of repeating an epoch for training a trained learning model generated in the first training step with a rate of error back-propagation in regard to the first image and a rate of error back-propagation in regard to the second image being made different from each other.

* * * * *